July 30, 1963 — A. R. FITZ SIMONS — 3,099,274
CONTROL CIRCUITS FOR MONEY ISSUING SYSTEM
Filed Sept. 17, 1959 — 4 Sheets-Sheet 1
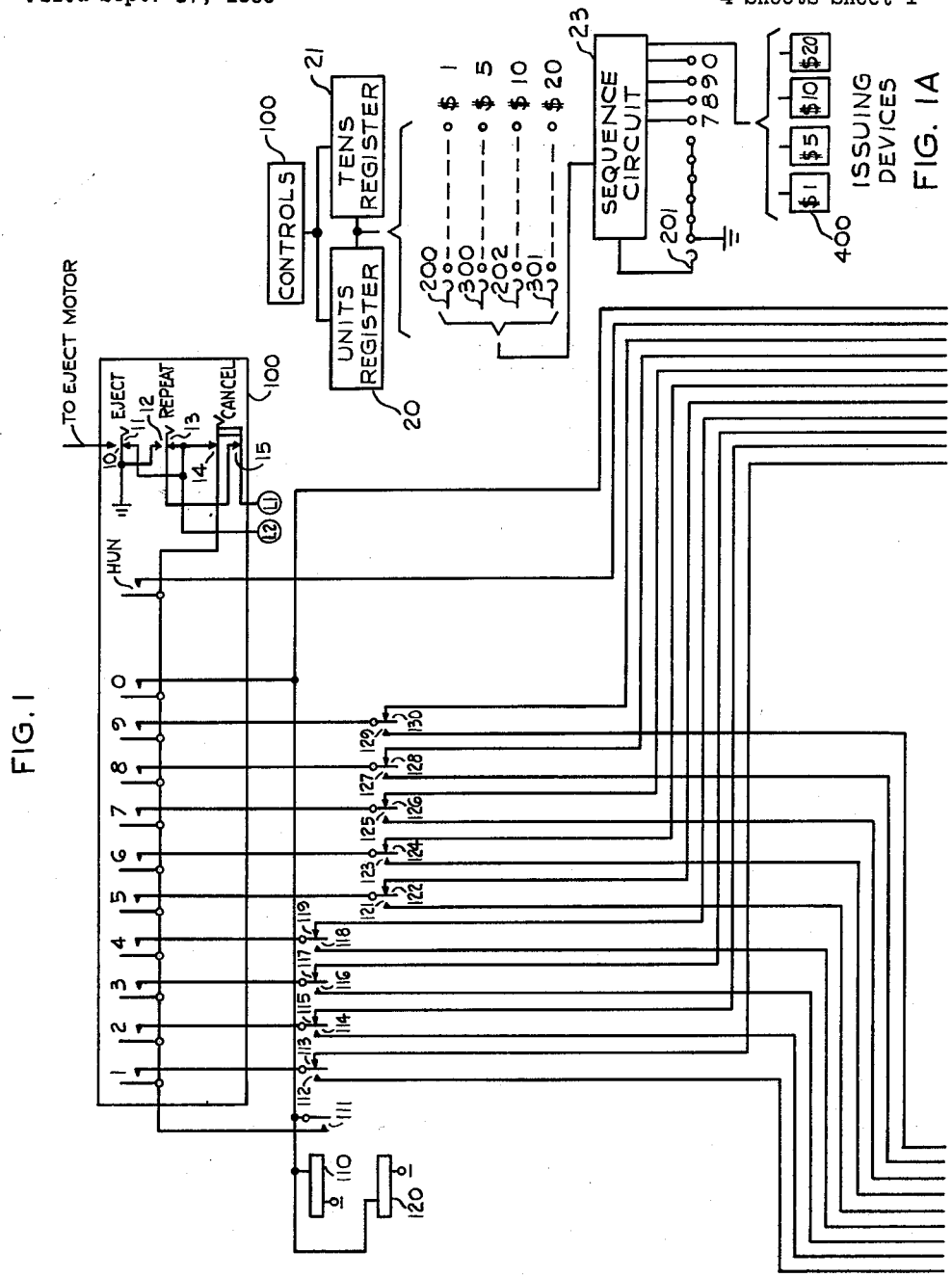
INVENTOR.
A. R. FITZ SIMONS
ATTORNEY

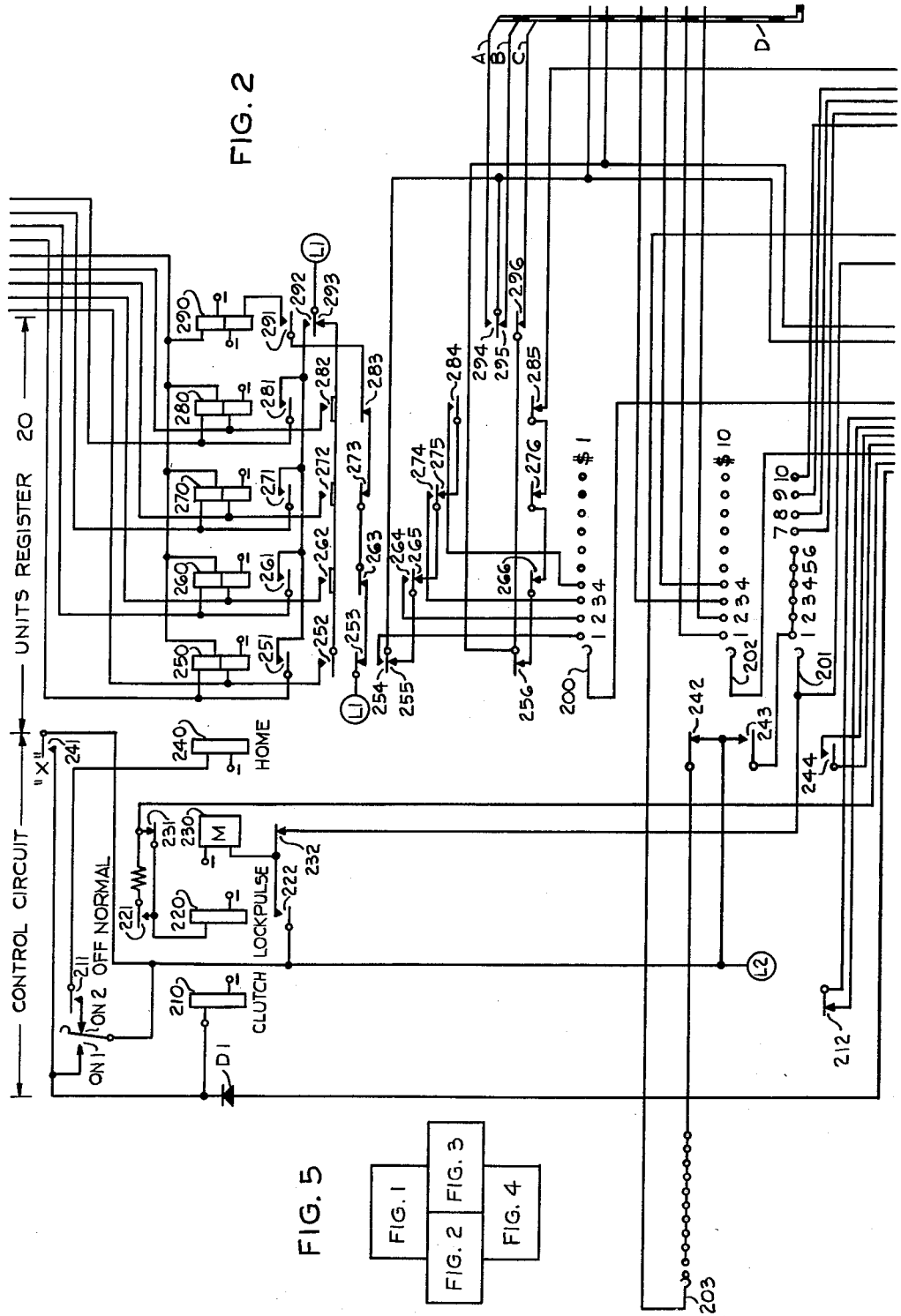

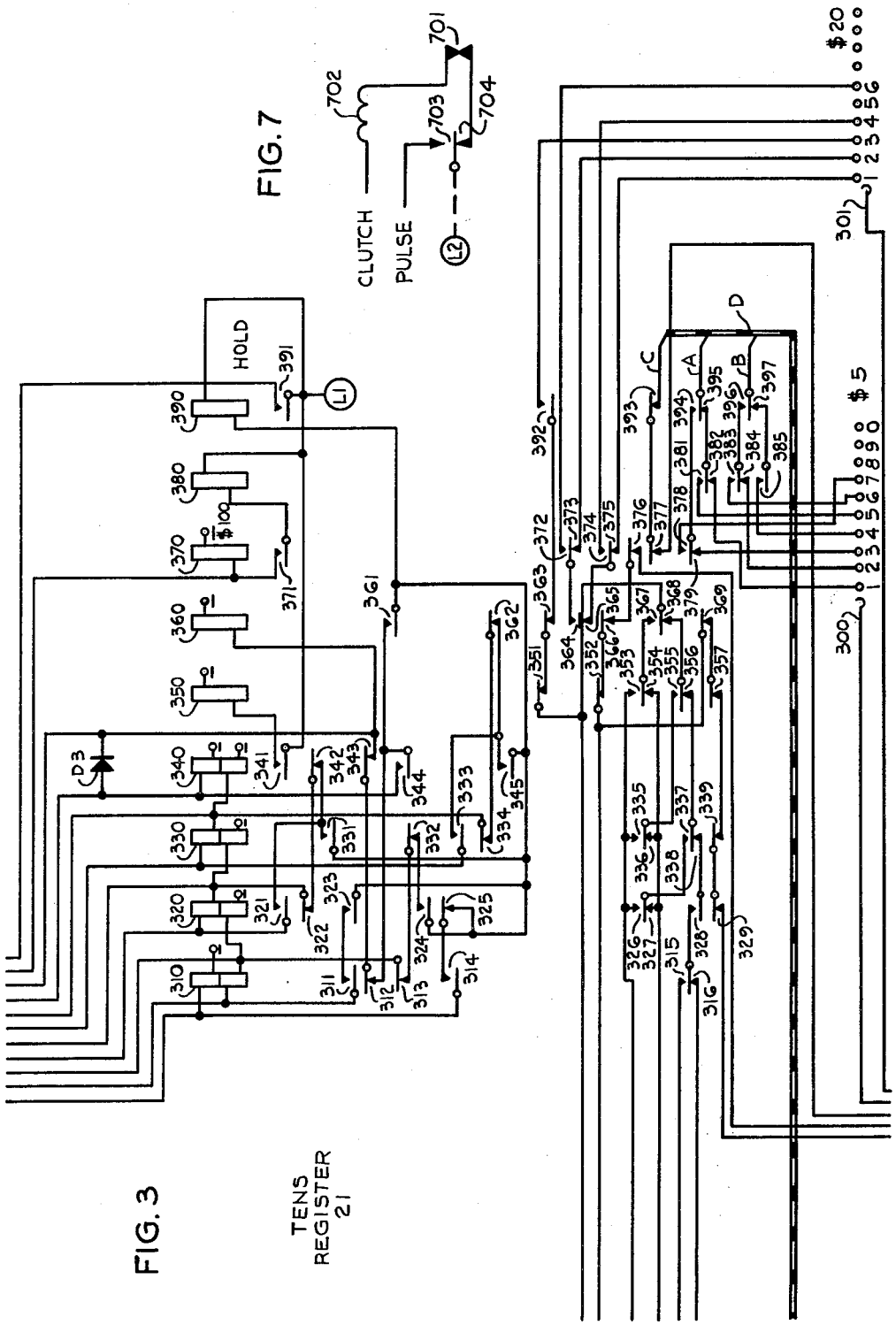

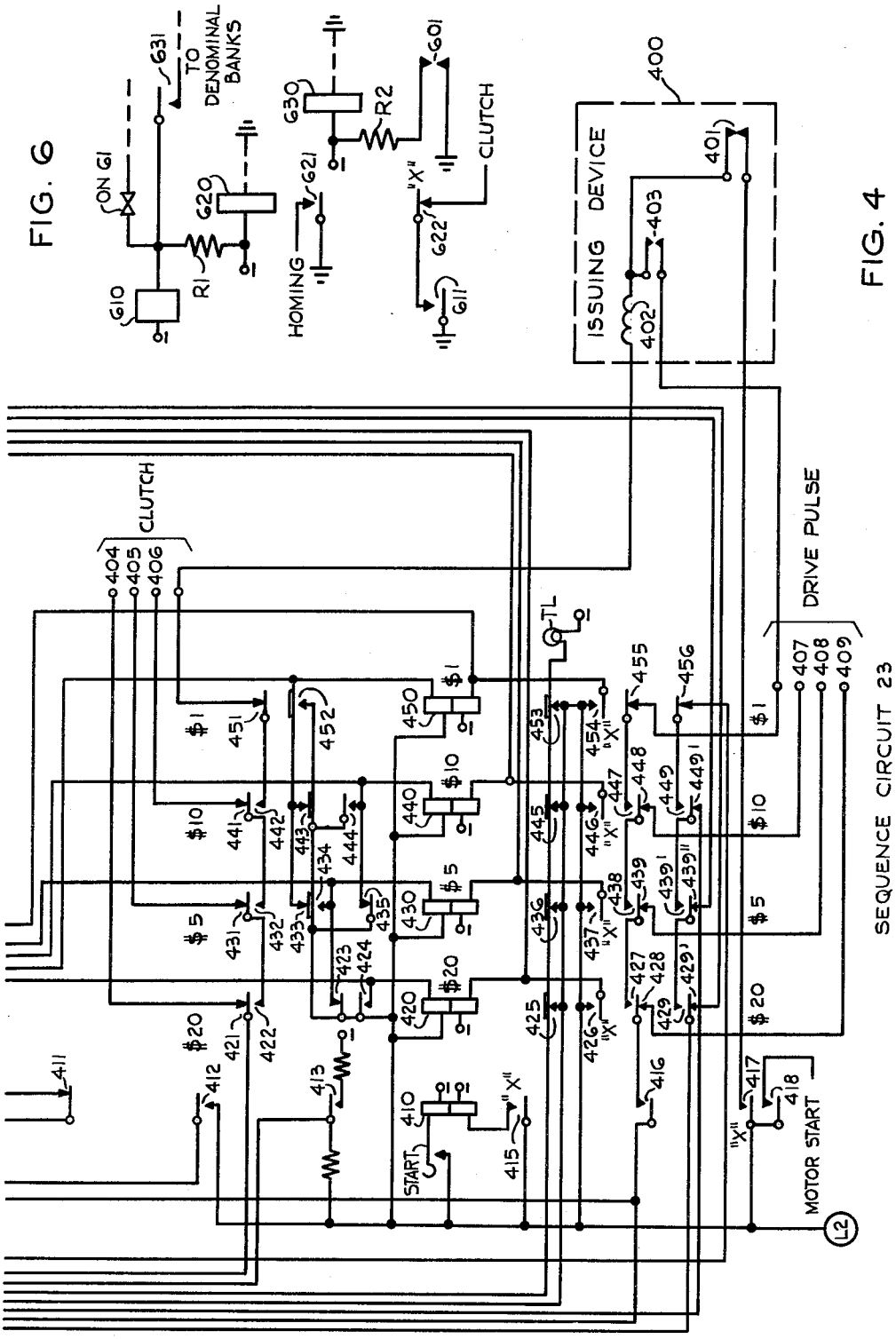

United States Patent Office 3,099,274
Patented July 30, 1963

3,099,274
CONTROL CIRCUITS FOR MONEY
ISSUING SYSTEM
Alan Rayment FitzSimons, 6650 S. Cicero Ave.,
Chicago Ridge, Ill.
Filed Sept. 17, 1959, Ser. No. 840,672
13 Claims. (Cl. 133—4)

This invention relates to control systems and more particularly to control circuits for money issuing systems.

Physically speaking "monetary units" may take the form of hard, durable, easily handled coins which may be processed through counting and issuing machines with a minimum of difficulty. On the other hand, monetary units may also take the form of frail, easily destroyed, paper bills which are difficult to process. While it is old to provide means for automatically dispensing coins, it has not been economically feasible to dispense paper money. For example, there are not only the problems of handling paper money, but also the problems of calculating the number and denomination of bills to issue, and the problems of providing interlocking controls which insure that the proper number of monetary units have in fact been issued. Recently, the problems of mechanically handling and issuing paper money have been solved; there remains the problems of calculating the number and demonination of bills that should be issued.

An object of this invention is to provide new and improved systems for controlling the issuance of monetary units.

Another object of this invention is to provide means for calculating the number and denomination of monetary units which are to be issued.

Yet another object of this invention is to provide means for checking to be certain that the proper number and denomination of monetary units have in fact been issued.

Still another object of this invention is to provide means for repeatedly issuing monetary units responsive to the same storage of information.

In accordance with this invention, means is provided for storing data in the form of numerical values which indicate dollar amounts. These amounts are translated into signals which indicate the number and denomination of monetary units that are to be issued. For example, the numerical value $7.50 may be translated to indicate one $5 bill, two $1 bills, and a 50¢ coin. A read-out device is provided in the form of an electromechanical switch having a plurality of levels or banks of contacts. Certain of the banks (hereinafter called "denominational banks") are wired to the translator in a manner such that each bank controls the issuance of one denomination of monetary units. Other of the banks (hereinafter called "control banks") cause a selection of one of the denominational banks and control the return of the switch to a normal or home position. An issuing mechanism issues monetary units of a first denomination in accordance with stored data. As each monetary unit is issued, a drive pulse is generated to provide an electrical interlock signal which controls the operation of the read-out switch as it scans the first denominational bank. When a translator applied marking is encountered on the first denominational bank, the issuance of monetary units is stopped and the read-out switch is automatically driven to its home position. Near the end of switch travel, as it approaches its home position, a marking in the control bank causes a sequence circuit to advance thereby selecting a second of the denominational banks. The read-out switch scans a second time, as it operates once more under the control of drive pulses generated responsive to the operation of an issuing mechanism. Again, a marking in a denominational bank stops the issuing mechanism and a marking encountered in the control bank near the end of switch travel advances a sequence to select a third of the denominational banks. The cycle repeats and the read-out switch scans once for each denomination until all monetary units are issued.

If the issuing mechanism detects a multilated monetary unit, two bills stuck together, or other conditions which delay the issuance of a bill, the read-out device merely waits until the issuing mechanism corrects itself to issue one good monetary unit. Thereafter, a drive signal from the issuing mechanism causes the read-out device to continue its scanning operation.

Usually, the system clears itself after the issuance of all monetary units indicated by the stored data. However, if a suitable control is operated, the system recycles and repeatedly issues the same amount of money to supply special needs as where a factory has many employees who receive the same pay, a race track pays out the same sum of money to many people who hold winning tickets, theaters issue the same change to patrons who present bills of a given large denomination, etc.

The above mentioned and other objects of this invention together with the manner of obtaining them will become more apparent and the invention itself will be best understood by making reference to the following description of an embodiment of the invention taken in conjunction with the accompanying drawings in which:

FIG. 1A shows the system by block diagram;

FIG. 1 shows a manually operated control set;

FIG. 2 shows a units register together with a circuit for controlling the read-out device;

FIG. 3 shows a tens register;

FIG. 4 shows a sequencing circuit which directs the issuance of bills;

FIG. 5 shows how FIGS. 1–4 should be joined to provide a complete and understandable circuit; and FIGS. 6 and 7 show other embodiments of the invention.

Where possible, simple terms are used and specific items are described hereinafter to facilitate an understanding of the invention; however, the use of such terms and references to such items are not to act in any manner as a disclaimer of the full range of equivalents which is normally given under established rules of patent law. For example, the drawings show means for issuing up to $199 since it has been found that this capacity accommodates most financial transactions; whereas, any suitable capacity may be provided by the expedient of duplicating parts. Moreover, the drawings show electromechanical devices; whereas, any suitable equipment such as logic circuitry may be used. Still further, the system has been shown in connection with the issuance of paper money only; whereas, it may be adapted to issue any monetary units. Furthermore, the system has been shown as operative responsive to manually keyed information; whereas, data may be supplied from any suitable device such as a cash register, calculating mechanism, perforated tape, a plurality of dials, or the like. Quite obviously, other examples could be selected to illustrate the manner in which the terms that have been used and the items which have been described are entitled to a wide range of equivalents.

DESCRIPTION OF COMPONENTS

As pointed out above, many different components may be provided; however, some of the components which are shown in the drawings may be explained in the following manner. Item 100 is a key-set which includes ten digit keys, and special keys marked "HUN," "EJECT," "REPEAT," and "CANCEL." Of these, the ten keys marked 1–0 are provided to store detailed information, i.e. any number between 1 and 99. The key marked "HUN" is a bulk storage key, i.e. each time that the "HUN" key is operated, an issuing mechanism issues $100. For example, to obtain $300, the "HUN" key may be operated three separate times and the circuit operates through three complete cycles; or, the repeat key made be utilized as explained below. After all monetary units are issued in accordance with the stored information, the "EJECT" key is operated and the issued money falls into a receptacle which is placed within the reach of either a teller or a patron.

Two sources of ground potential (marked L1 and L2) are shown in association with key set 100. All ground potentials that are required elsewhere in the drawings are supplied through one of these terminals, as indicated. Operation of either the "CANCEL" or the "EJECT" key, per se, removes both the L1 and L2 ground potentials thereby releasing all equipment shown elsewhere in the drawings. However, if the "EJECT" key is operated after the "REPEAT" key, ground L1 continues to be applied to hold the registers in an operated condition while ground L2 is removed to release the remainder of the circuits thereby causing the read-out device to recycle each time that the "START" key (FIG. 4) is operated. In this manner, any desired number of bundles of money (each having the same number and denomination of monetary units) may be issued.

The read-out device takes the form of a rotary switch having at least six banks or levels. Four of the banks are denominational banks, i.e. the $1 bank is wiped by brush 200, the $10 bank is wiped by brush 202, the $5 bank is wiped by brush 300, and the $20 bank is wiped by brush 301. Two control banks are shown—one is a sequence control bank which is wiped by brush 201, the other is a homing bank which is wiped by brush 203.

Issuing device 400, shown in the lower right hand portion of FIG. 4, includes mechanical rollers (not shown) which issue one monetary unit each time that the magnetic clutch winding 402 is energized. Contacts 401, which are extremely sensitive to thickness, open if two bills stick together or multilated bills attempt passage through the issuing device. Contacts 403 are adapted to close for the entire time that is required for a bill to pass through the issuing device. Each denomination of monetary units is stored in a separate bin which has an issuing device individual thereto. Only one issuing device 400 is shown in the detailed drawing; however, it should be understood that other issuing devices are connected to be operated in a similar manner, as indicated in FIG. 1A. For example, the issuing device for a $10 bin is connected to terminals 406 and 407 (FIG. 4), the issuing device for a $5 bin is connected to terminals 405 and 408, while the issuing device for a $20 bin is connected to terminals 404 and 409.

BRIEF DESCRIPTION

FIG. 1A is a block diagram showing the principles of the system. A control device 100 of any suitable design may be operated to cause the storage of a numerical value in tens register 21 and in units register 20 to indicate the dollar amount of money that is to be issued. The registers translate such information into markings which are selectively applied to the denominational banks to indicate the number and denomination of bills which are to be issued. For example, if one $1 bill is to be issued, brush 200 encounters a marking on the first terminal of the $1 bank.

After all data is stored, a suitable control is operated in sequence device 23 to start the read-out whereupon all brushes shown in the drawing move in unison. A first brush associated with a denominational bank is effective for causing the issuance of an indicated number of bills of that denomination. For example, if brush 301 encounters a marking on the third set of contacts, three $20 bills are issued by the $20 issuing device. Thereafter, brush 201 causes the switch to step over the remainder of the first six terminals responsive to ground-potential permanently connected thereto. On the 7–0 terminal, brush 201 causes sequence circuit 23 to select the next denominational bank that is to be effective. For example, as brush 201 passes over the zero terminal, near the end of switch travel, the $5 denominational bank is selected. The read-out switch is reoperated and as brush 300 scans the $5 bank, a certain number of bills are issued in accordance with markings applied thereto by registers 20 and 21. Again, brush 201 is effective near the end of switch travel to select the next denominational bank which is to control the issuance of monetary units. In a similar manner, sequence device 23 cooperates with brush 201 to assign each associated denominational bank when it is to be effective.

Sequence device 23 cancels the read-out scan for non-used-denominations. For example, if only $1 and $20 bills are to be issued, the $5 and $10 scans are automatically eliminated.

DETAILED DESCRIPTION

*Hundreds register.*—Means is provided for bulk storing certain information, i.e. a single key may be operated to to indicate a gross amount of money such as one hundred dollars, for example. In greater detail, if a teller operates key "HUN" a circuit may be traced from ground through contacts 11, 14, key "HUN" and the winding of $100 relay 370 to battery. Relay 370 operates and closes contacts 374 which cause a translation that indicates four $20 bills. Also responsive to the operation of relay 370, contacts 371 close to operate slave relay 380 over a circuit in series with the winding of relay 370 which extends to ground L1. Responsive thereto, contacts 385 close to cause a translation that indicates four $5 bills. Thus, a total of $100 is issued each time that the hundreds key "HUN" is operated.

*Tens register.*—Means is also provided for detail storing certain information, i.e. any amount from $1–$99 may be keyed-into the system. The first digit which is keyed via contacts 1–0 of key set 100 operates the tens register of FIG. 3. For example, if the tens digit "1" is keyed, a circuit may be traced from ground through contacts 11, 14, key 1 of key-set 100, contacts 113 and the upper winding of relay 310 to battery. When relay 310 operates, its contacts 314 close, thereby preparing to hold relay 390 over a circuit which may be traced from ground L1 through the winding of relay 390, contacts 325, 314, and the upper winding of relay 310 to battery. Responsive to the operation of relay 390, contacts 396 close thereby marking the second terminal in the $5 bank to indicate that two $5 bills are to be issued. Therefore, the numerical value of $10 is translated to indicate two $5 bills.

If the circuits from key-set 100 are traced through the tens register of FIG. 3, it is found that the register relays are operated to give the translations which are set forth in the following table:

| Tens Digit | Relays Operated | Translation |
| --- | --- | --- |
| 10 | 310, 390 | Two $5. |
| 20 | 310, 320 and 390 | One $10, two $5. |
| 30 | 320, 390 | Two $10, two $5. |
| 40 | 320, 330, 390 | Three $10, two $5. |
| 50 | 330, 390 | Four $10, two $5. |
| 60 | 330, 340, 350, 390 | One $20, three $10, two $5. |
| 70 | 340, 350, 390 | One $20, four $10, two $5. |
| 80 | 340, 350, 360, 390 | Two $20, three $10, two $5. |
| 90 | 360, 390 | Two $20, four $10, two $5. |
| 100 | 370, 380 | Four $20, four $5. |

If a circuit is traced from terminal 1 of the $20 bank through the translator contacts, it is found that there are no normally opened contacts; however, there is no danger of issuing a $20 bill inadvertently since the circuit leading to brush 301 is open at contacts 429' whenever no $20 bills are to be issued.

Means is provided for interlocking the digit keys and the tens register to prevent storage of the same digit in both the tens and units register. That is, operation of one of the digit keys 1–0 causes one or more of the tens register relays 310–360 to operate. Responsive thereto, a circuit is closed to prepare hold relay 390. However, relay 390 does not operate since its winding is shunted by ground applied through the operated digit key. For example, if the digit 8 is keyed in a tens position, relay 340 operates via its upper winding and relay 360 operates via diode D3. The shunt circuit for relay 390 extends from ground L1 through the winding of relay 390, contacts 361, 344, contacts 128, key 8, contacts 14 and 11 to ground. When the teller removes his finger from key 8, its contacts open and relay 390 operates over a locking circuit which may be traced from ground L1 through the winding of relay 390, contacts 361, 344, and the upper winding of relay 340 to battery. Also, a circuit may be traced in parallel therewith through diode D3 and the winding of relay 360 to battery. Responsive to the operation of relay 390, contacts 391 close and complete an obvious circuit to operate relays 110 and 120 which lock at contacts 111. Both of the relays 110 and 120 perform the same function—two relays are shown in the drawings only because the total weight of all contact springs 111–119, and 121–130 is excessive for one relay of conventional and economical design. When contacts 112–119 and 121–130 operate, the digit keys are shifted from connection with tens register 21 to connection with units register 20. Hence, there is an interlock because relay 390 cannot operate until a key in set 100 releases, and the units register is not connected to key-set 100 until after relay 390 operates.

If there is no tens digit, the teller keys the numeral "0" and a circuit is completed from battery through the windings of relays 110 and 120, key 0, contacts 14 and 11 to ground. Responsive to the operation of relays 110 and 120, the key-set is shifted to association with the units register as explained above.

*Units register.*—The circuit is now ready for operation of a key in FIG. 1 to cause a units digit storage in the units register of FIG. 2. For example, if key 1 of key-set 100 is operated, a circuit may be traced from ground through contacts 11, 14, key 1, contacts 112 and the lower winding of relay 250 to battery. When relay 250 operates, contacts 254 close to mark the first terminal in the $1 bank.

As with the tens register, explained above, a numerical value is stored to indicate a dollar amount and translated data is read-out in terms of denomination and number of monetary units. That is, if the circuits leading to and controlled by the relays of the units register (FIG. 2) are traced, it is found that the following translations are made.

| Units Digit | Relays Operated | Translation |
| --- | --- | --- |
| 1 | 250 | One $1. |
| 2 | 260 | Two $1. |
| 3 | 270 | Three $1. |
| 4 | 280 | Four $1. |
| 5 | 290 | One $5. |
| 6 | 250, 290 | One $5, one $1. |
| 7 | 260, 290 | One $5, two $1. |
| 8 | 270, 290 | One $5, three $1. |
|   | 280, 290 | One $5, four $1. |

After all information has been keyed-into the registers, the key marked "Start" is operated—see the left-hand portion of FIG. 4. Responsive thereto, relay 410 operates over an obvious circuit and first closes its "X" or preliminary contacts 415 and 417. Contacts 415 complete a locking circuit from battery through the lower winding of relay 410 to ground L2. Contacts 417 apply L2 ground to double document sensing contacts 401 and to corresponding contacts in each issuing device similar to 400 (not shown) but associated with bins for other denominations. After the "X" or preliminary contacts are closed, contacts 413 close thereby completing a circuit which may be traced from a voltage divider through contacts 413, 212, 421 and a clutch conductor, e.g. via terminal 404 to a magnetic clutch similar to winding 402 but associated with the issuing bin, double document contact like 401 and contacts 417 to ground L2. Contacts 418 close to start a motor of any suitable form thereby providing the power which enables the issuing devices to operate. Contacts 411 open but have no effect at this time. Contacts 416 close to prepare for stepping the read-out switch. Contacts 412 close to prepare for interaction between the sequence switch and the registers.

*Read-out.*—The next circuit functions depend upon the values which are stored in the registers. For the purposes of this explanation, it is assumed that the number keyed-into the registers is $199. Referring to the charts which were given above, it is seen that keying the $100 digit causes four $20 bills and four $5 bills to issue. The tens digit "9" or $90 causes two $20 bills, four $10 bills, and two $5 bills to issue. Units digit "9" causes one $5 bill and four $1 bills to issue. Thus, the dollar value $199 has been translated to indicate six $20 bills, four $10 bills, seven $5 bills and four $1 bills.

Means is provided for issuing the first bill responsive to the completion of a circuit which may be traced from a voltage divider through contacts 413, 212, 421, terminal 404, a "CLUTCH" conductor, a magnetic coil similar to coil 402, double document contacts similar to contacts 401 (both associated with the $20 bin) and contacts 417 to ground L2. As soon as the $20 magnetic clutch coil is energized, an issuing device associated with the $20 bin is energized. If a bill of standard thickness is issued, contacts 401 do not open; therefore, the magnetic clutch winding similar to 402 continues to be energized over the above traced circuit extending via terminal 404. As each bill moves through the issuing device, a mechanical device (not shown) closes contacts similar to 403 thereby transmitting a pulse to indicate the successful ejection of one bill.

Means is provided for delaying the read-out responsive to the detection of a monetary unit which should not be issued. For example, if two bills stick together, or if a bill is mutilated, contacts 401 open thereby breaking the drive circuit which may be traced from battery through the winding of relay 220, contacts 231, 416, 428, terminal 409, contacts 403, 401, and 417 to ground L2. If relay 220 is not energized, the switch does not step and read-out is delayed. Thereafter the issuing device searches for a monetary unit which should be issued; whereupon, contacts 401 close, relay 220 operates, and the read-out switch resumes its operation.

Responsive to a bill issuance signal, a circuit is completed which may be traced from ground L2 through contacts 417, double document contacts 401, issuing contacts 403, terminal 409, contacts 428, 416, 231 and the winding of lock pulse relay 220 to battery. Relay 220 operates and closes contacts 221, thus locking via a circuit extended through contacts 403 until a bill is completely issued. Contacts 222 also close thereby energizing rotary magnet 230. After an issuing bill has passed through the issuing device, contacts 403 open thereby releasing lock pulse relay 220. Responsive to the release of relay 220, contacts 222 open, thereby releasing rotary magnet 230. In this manner, there is a positive interlock between operation of the rotary switch and the closure of issuing pulse contacts 403 whereby the rotary switch is prevented from taking two steps responsive to the issuance of one bill.

When magnet 230 operates brushes 200, 201, 202, 203, 300 and 301 take one step. Also responsive to the operation of rotary magnet 230, contacts 231 open thereby breaking the original operate circuit for relay 220. It should be noted that relay 220 holds over contacts 221 after contacts 231 open if an issuing bill is holding contacts 403 in a closed position. Contacts 232 open to break part of the homing circuit.

The rotary switch takes one step responsive to each $20 bill that is issued until a marking is encountered by brush 301. Referring to the charts set forth above and remembering the assumption that the numerical value $199 was keyed into the system, it is seen that relays 360, 370, 380, and 390 are operated in the tens register and that a total of six $20 bills are to be issued. Under these conditions, a circuit may be traced through the sixth terminal of the $20 bank as follows: battery, the winding of relay 210, diode D1, contacts 429', wiper 301, the sixth terminal in the $20 bank, operated contacts 372, 364, contacts 416, 428, terminal 409, contacts similar to 403, and 401 in the issuing device, associated with the $20 bin, and contacts 417 to ground L2. Relay 210 operates to open contacts 212 and break a circuit through a clutch winding like 402 associated with the $20 bin, thereby terminating the issuance of $20 bills.

Means is provided for insuring the return of the switch to a normal position. That is, the switch steps over all of the contacts shown in the drawing and then an additional step is required to drive the switch to a normal or starting position. Off-normal contacts ON1 and ON2 are normally in the position shown except on the additional step at which time contacts ON1 close and contacts ON2 open. Therefore, after the clutch relay 210 operates (as explained above) contacts 211 close and home relay 240 operates over a circuit extending from battery through the winding of relay 240, contacts 211 and ON2, to ground L2. Responsive thereto "X" or preliminary contacts 241 close before other contacts controlled by relay 240 to hold clutch relay 210 in an operated position, thereby locking relay 240 via contacts 211. Contacts 242 open to remove ground from the bank which controls the homing of the switch under abnormal conditions and contacts 243 close to apply ground to the first six terminals of the control bank which is wiped by brush 201.

The rotary magnet 230 operates through its self-interrupted contacts 232 thus driving the switch home and operating the $20 sequence relay 420. That is, as wiper 201 steps over an associated control bank, a circuit may be traced from ground L2 through contacts 443, terminal 7, wiper 201, contacts 232, and the winding of rotary magnet 230 to battery. The upper or operate winding of relay 450 is also connected to terminal 7; however, there is no effect since it is shunted. As wiper 201 steps over terminal 8, a circuit may be traced from ground L2 through contacts 435, terminal 8, wiper 201, contacts 232 and the winding of rotary magnet 230 to battery. Again, a circuit including terminal 8 is connected through the upper winding of relay 440 which is shunted at this time. A circuit may be traced from ground L2 through contacts 423, terminal 9, wiper 201, contacts 232 and the winding of rotary magnet 230 to battery. Again, terminal 9 is also connected to the upper winding of relay 430 which is shunted at this time. On the terminal 10, a circuit is completed from ground L2 through the upper winding of $20 relay 420, terminal 10, brush 201, contacts 232, and the winding of rotary magnet 230 to battery. Relay 420 operates, thereby advancing the sequence to prepare for the issuance of $5 bills.

At the end of switch travel off-normal contacts ON2 open, relay 240 releases and relay 210 is held by ground L2 which is extended via contacts ON1. Responsive to the release of relay 240, contacts 242 close and a circuit is completed which may be traced from ground L2 through contacts 242, the eleventh step contact and wiper 203, contacts 411 and contacts 232 to battery through the winding of magnet 230 whereupon the wipers step to a normal or home position. Thereafter off-normal contacts ON1 and ON2 return to the position shown in the drawing and relay 210 releases.

The electromechanical read-out switch is reoperated; however, this time the $5 denominational bank is effective. The rotary switch has been driven to its home position and relay 420 has operated, therefore, the clutch circuit may be traced from the voltage divider through contacts 413, 212, 422, 431, terminal 405, a magnetic clutch coil similar to 402 but associated with a $5 bin and contacts like 401 to ground L2 on contacts 417. Once again, bills are issued automatically and as each bill passes contacts similar to 403 a circuit is completed for driving the rotary switch a step further, as explained above in connection with the issuance of $20 bills. When the seventh terminal is encountered by wiper 300, a circuit is completed which may be traced from battery through the winding of relay 210, diode D1, contacts 429, 439'', wiper 300, terminal 7, contacts 378, 394, conductor A, cable D, conductor A, contacts 294, 416, 427, 439, terminal 408, contacts similar to 403 and 401 but associated with the $5 bin, and contacts 417 to ground L2. Responsive to the operation of relay 210, contacts 211 close to operate home relay 240 for reasons explained above, contacts 212 open to deenergize the $5 clutch and thereby terminate the issuance of $5 bills.

The sequence is advanced under the control of wiper 201 and the associated bank of contacts. For example, on the seventh terminal, a shunt circuit may be traced through contacts 443 to ground L2 thereby shunting the upper winding of $1 relay 450 and on the eighth terminal a circuit may be traced through contacts 435 to ground L2, thus shunting the upper winding of $10 relay 440. However, when the ninth terminal is encountered $5 relay 430 operates to advance the sequence since the shunt around its upper winding has been opened at contacts 423 by previously operated $20 relay 420. The operate circuit is as follows: ground L2, the upper winding of relay 430, terminal 9, brush 201, contacts 232, and the winding of magnet 230 to battery.

Next, the $10 bank is effective. The issuing device associated with the $10 bin is rendered effective when a magnetic clutch thereat is energized over a circuit which may be traced from the voltage divider through contacts 413, 212, operated contacts 422, 432, rest contacts 441, and terminal 406 to a magnetic clutch coil similar to 402 and to contacts similar to 401 but associated with the $10 bin, and contacts 417 to ground L2. Responsive thereto, the issuing device associated with the $10 bin begins issuing bills and as each bill is issued, contacts like 403 close thereby returning a pulse over terminal 407 to step the rotary switch by operating relay 220, as explained above. When wiper 202 encounters the fourth terminal in the $10 denominational bank, a circuit may be traced from battery through the winding of relay 210, diode D1, contacts 429, 439' and 449' to brush 202, terminal 4, contacts 354, operated contacts 367, contacts 416, 427, 438, 448, terminal 407, the contacts similar to 403 and 401 associated with the $10 issuing mechanism, and contacts 419 to ground L2.

Thereafter, the rotary switch is driven home, responsive to control signals encountered by brush 201, as explained above. That is, during the first six steps, driving ground L2 is extended through contacts 243, brush 201, contacts 232 and the winding of magnet 230 to battery. On the seventh terminal, a circuit in shunt with the upper windings of $1 relay 450 may be traced from ground L2 through contacts 443, terminal 7, wiper 201, contacts 232 and the winding of rotary magnet 230 to battery. On the eighth terminal, a circuit may be traced from ground L2 through the upper winding of $10 relay 440, terminal 8, wiper 201, interrupter contacts 232, and the winding of rotary magnet 230 to battery. Responsive thereto, $10 relay 440 operates and locks at contacts 446 to advance the sequence and issue $1 bills. On each of the other steps, the rotary switch is driven responsive to the completion of a circuit extending to ground through the upper windings of relays 430 and 420; however, each has operated and locked at its contacts 437 and 426, respectively.

On the fourth and final wipe, the rotary switch is driven as explained above by pulses emanating from contacts 403 which are shown in association with the issuing device of the $1 bin. When the rotary switch brush 200 encounters the fourth terminal in the $1 bank, a circuit for terminating the issuing of monetary units is completed (as explained above) over the circuit extending from battery through the winding of relay 210, diode D1, contacts 429, 439', 449, 456, wiper 200, terminal 4, operated contacts 284, rest contacts 275, 265, 255, operated contacts 416, 427, 438, 447, rest contacts 455, contacts 403 and 401 to ground L2 via contacts 417.

The switch is stepped automatically to a home position. That is, the remaining of the first six steps are completed responsive to strappings in the control bank that is wiped by brush 201. When brush 201 encounters the seventh terminal, a circuit is completed for operating relay 450 which may be traced from ground L2 through the upper winding of relay 450, terminal 7, brush 201, interrupter contacts 232, and the winding of rotary magnet 230 to battery.

As each of the sequencing relays operates one of the contacts 425, 436, 445 and 453 opens. On the eleventh or additional step contacts 244 open and bulb TL is extinguished to indicate the end of issuance. Prior thereto, a circuit could be traced from ground L2 to battery via at least one of the above mentioned contacts and the filament of bulb TL which burned to indicate that the read-out was in progress.

Thus, it is seen that the counting circuit has caused the issuance of six $20 bills, seven $5 bills, four $10 bills, and four $1 bills. In a similar manner, any numerical value up to $199 may be keyed into the system and a proper number of bills are issued in accordance therewith. It should also be obvious that the number and denomination of bills is a matter of choice which may be determined by the expedient of changing the wiring on the banks of the rotary switch. Quite obviously, any suitable combination of bills may be issued.

REPEAT

All bills issued by the operations just described, are trapped and held until a teller operates the "EJECT" key of FIG. 1. Thereafter, the bills are deposited in any suitably located receptacle. The operation of the "EJECT" key also opens contacts 11 to remove ground from all L1 and L2 terminals which are shown elsewhere in the drawings. Thus, all circuits are restored to normal after which another group of bills may be issued responsive to the keying of new information. On the other hand, the teller may operate the "REPEAT" key before the "EJECT" key in which case a circuit is completed from ground through contacts 12 and 15 to terminal L1. When the "EJECT" key is operated thereafter, ground L2 is removed at contacts 11 to release the sequence circuit of FIG. 4 and the control circuit of FIG. 2; however, ground L1 remains connected via contacts 15 and 12 to hold information which is stored in the units and tens registers. Each time that the "START" key is operated thereafter, the system recycles and issues the same number and denomination of bills.

CANCEL BY DENOMINATION

For the purposes of this explanation, it is assumed next that the bills of only one denomination are to be issued. For example, if it is assumed that the teller has keyed the numeral "05," the issuing device associated with the $5 bin issues one bill and the issuing devices associated with the $1, $10, and $20 bins are not operated.

When the digit "0" is keyed in a tens position, a circuit is completed from ground through contacts 11, 14, key 0, and the windings of relays 110 and 120 to battery. Responsive to the operation of relays 110 and 120, contacts 111 close a locking path to hold relays 110 and 120 in an operated condition. Contacts 112–119 and 121–130 operate to disconnect the tens register and to connect the units register.

When the units digit "5" is keyed, relay 290 operates over a circuit which may be traced from ground through contacts 11, 14, key 5, contacts 121, and the upper winding of relay 290 to battery. Relay 290 operates and closes a locking circuit which may be traced from battery through its lower winding, contacts 291, 283, 273, 263, and 253 to ground L1. Contacts 292 close but have no effect because the digit "5" was keyed. Also responsive to the operation of relay 290, contacts 294 close while contacts 295 and 296 open thereby translating the numerical value "5" into signals indicating one $5 bill.

Means is provided for cancelling by denomination. That is, when the teller operates the start key, relay 410 operates as explained above. First, the "X" or preliminary contacts 415 and 417 close to lock relay 410 and to apply ground L2 to each of the issuing devices. Thereafter, contacts 418 close to start the motor which drives the issuing devices. Contacts 412 close and complete a circuit for operating various relays in the sequence circuit thereby selecting the $5 issuing device as that which is to issue money at this time and cancelling the issuance at other bins. For example, a circuit may be traced from ground L2 through contacts 412, 256, 266, 276, and 285 to the lower winding of $1 relay 450 which operates and locks over its "X" or preliminary contacts 454 to ground L2. A circuit may also be traced from ground L2 through contacts 412, 369, 357, 339, 329 and the lower winding of $10 relay 440. Relay 440 operates and locks at its "X" contacts 446. Still further, a circuit may be traced from ground L2 through contacts 412, 296, conductor C, cable D, conductor C, contacts 393, 377 and the lower winding of $20 relay 420 to battery. Relay 420 operates and closes its "X" contacts 426 thereby locking to ground L2.

Thus, it is seen that the $1, $10, and $20 relays have operated to cancel issuing of those denominations—only $5 bills will be issued.

Responsive to the operation of contacts 413, a circuit is completed from the voltage divider through contacts 212, 422, 431, terminal 405, a magnetic clutch winding similar to 402 and contacts similar to 401 (both associated with the $5 bin), and contacts 417 to ground L2. Responsive to the energization of the clutch winding, the issuing mechanism begins to issue $5 bills. As the first bill passes contacts similar to 403, a circuit is completed for stepping the rotary switch as follows: battery extended through the winding of lock pulse relay 220, contacts 231, 416, 427, 439, terminal 408, contacts similar to 403 and 401 associated with the $5 bin issuing device and contacts 417 to ground L2.

Since relay 290 is operated to indicate the issuance of a single $5 bill, a marking is encountered after issuance of one $5 bill as follows: battery extended through the winding of relay 210, diode D1, contacts 429, 439", brush 300 and associated terminal 1, contacts 382, 395, conductor A, cable D, conductor A, contacts 294, 416, 427, 439, terminal 408, contacts similar to 403 and 401 of the issuing device associated with the $5 bin and contacts 417 to ground L2. Relay 210 operates and opens contacts 212 thereby breaking the circuit to the magnetic clutch coil associated with the $5 bin and terminating the issuance of bills. The rotary switch is driven home as described above, after which the teller operates the "EJECT" key, thus removing all ground potentials and releasing any relays which may be operated.

HOMING CIRCUIT

If for any reason the rotary switch is off-normal when start relay 410 releases, there is an abnormal situation and it is necessary to drive the switch to a home position. Therefore, with all relays released and the rotary switch off-normal, a circuit may be traced from ground L2 through contacts 242, a bank associated with wiper 203, contacts 411, interrupter contacts 232, and the winding of rotary magnet 230 to battery. As long as brush 203 is resting upon one of the associated marked terminals, rotary magnet 230 operates in a self-interrupted fashion to drive the switch home. When brush 203 steps off the marked terminals, the homing circuit is broken and switch motion ceases.

ALTERNATE DRIVE CIRCUIT

The foregoing specification has described an interaction between the read-out switch and an issuing device whereby a bill is first issued; then, contacts operated by the issuing bill closes a circuit to step the read-out switch as it searches for a marking in the denominational bank which will stop the issuing of monetary units. It is within the scope of the invention to reverse the procedure and step the minor switch to drive the issuing device as shown in FIG. 6.

FIG. 6 is used in connection with circuits such as those shown in FIGS. 1–4 except that denominational banks are normally marked with the ground potential when a monetary unit is to be issued and by an absence of ground when no monetary units are to be issued.

In FIG. 6, the teller operates a start key (not shown) thereby causing a circuit to close via off-normal contacts ON61 for operating motor magnet 610 to "kick-off" the read-out switch. As the switch takes its first step off-normal contacts ON61 open thereby breaking the kick-off circuit previously extended to magnet 610. Responsive to the operation of magnet 610, contacts 611 close a circuit via contacts 622 to energize the clutch of an issuing device and cause the issuance of one monetary unit. As the monetary unit passes contacts 601, a circuit is closed to shunt the winding of relay 630 via resistance R2. When the monetary unit has completely passed out of its bin, contacts 601 open, relay 630 is no longer shunted by current through resistance R2, and a circuit is effective for causing relay 630 to operate and close contacts 631. The next operation depends upon the marking which is encountered in the denominational bank. If ground potential is present, a circuit is completed through contacts 631 to operate motor magnet 610. Responsive thereto, the read-out switch takes one step and contacts 611 close to command the issuance of another monetary unit. When the read-out switch finds an absence of ground marking, motor magnet 610 is not energized when contacts 631 close as explained above. Contacts 611 do not close and no further monetary units are issued.

Each time that a ground potential is encountered in a denominational bank, the winding of relay 620 is shunted via resistance R1. When an absence of ground marking is encountered, "X" or preliminary contacts 622 open first to break the circuit to the clutch of the issuing device. Thereafter, contacts 621 close to drive the read-out switch to a home position.

FIG. 7 shows yet another drive circuit which provides an interlock between issuing bills and the control circuit. Clutch 702 corresponds to clutch 402, contacts 701 correspond to contacts 401 and contacts 703 and 704 correspond to contacts 403. The circuit operates as explained above except that contacts 704 open the circuit to the clutch winding during the passage of bills out of the issuing device. In this manner there is a positive interlock because contacts 703 close to step the read-out switch at a time when contacts 704 are open to prevent the issuance of a monetary unit and vice versa. The action of contacts 703 and 704 is, therefore, mutually exclusive so that any suitable circuit may be added whereby contacts 704 complete a circuit for driving the read-out switch which takes one step to command the issuance of one monetary unit, a bill or other unit issues to close contacts 703 and cock the read-out switch which steps when contacts 704 close after the bill or other unit issues.

While the principles of the invention have been described above in connection with specific apparatus, it is to be clearly understood that this description is made only by way of example and not as a limitation on the scope of the invention.

I claim:
1. A money issuing system for issuing both paper money and coins comprising means for storing data in the form of numerical values indicating dollar amounts, means for translating said numerical values to indicate the denomination and number of monetary units that is to be issued, read-out means, means for causing said read-out means to scan said translating means once for each denomination of monetary units that is to be issued, and means responsive to each scan for commanding the issuance of said indicated number of monetary units of the particular denomination that is indicated by the scan which is then in process.

2. The system of claim 1 and means for holding said stored data, and means for recycling said read-out means for repeatedly issuing monetary units in accordance with said stored data, whereby the same amount of money may be issued any desired number of times responsive to one storing of data.

3. The system of claim 1 and means responsive to the detection of a monetary unit which should not be issued for delaying further operation of said read-out means, and means thereafter responsive to the detection of a monetary unit which should be issued for causing said read-out means to resume operation.

4. A money issuing system for issuing both paper money and coins comprising means for storing data in the form of numerical values indicating a dollar amount, means for translating said stored data into signals for directing the issuance of monetary units, means for reading out said signals, means for starting the issuance of said monetary units of a first denomination, means responsive to the issuance of each monetary unit for returning a control signal to said read-out means, means responsive to said returned control signal for advancing said read-out means, and means responsive to a signal from said translating means for stopping the issuing of said monetary units.

5. The system of claim 4 and means for driving said read-out means to a home position responsive to said translating means signal, means for selecting a second denomination, and means for reoperating said read-out means to command the issuing of monetary units of said second denomination.

6. The system of claim 4 and means responsive to the detection of a monetary unit which should not be issued for delaying further operation of said read-out means, and means thereafter responsive to the detection of a monetary unit which should be issued for causing said read-out means to resume operation.

7. The system of claim 4 wherein said means for storing numerical values comprises means for storing certain of said data in bulk and other of said data in detail.

8. The system of claim 4 wherein said read-out means comprises an electromechanical switch, said means for advancing said read-out means comprising a relay operated responsive to said returned control signals, means for locking said relay in an operated condition responsive to the operation of said relay, means responsive to the operation of said relay for advancing said electromechanical switch, and means responsive to a complete issuance of a monetary unit for releasing said relay.

9. The system of claim 4 and means for holding said stored data, means for recycling said read-out means for repeatedly issuing the same grouping of monetary units in accordance with said stored data, whereby the same amount of money may be issued any desired number of times responsive to one storing of data.

10. A money issuing system for issuing both paper money and coins comprising means including a plurality of registers for storing keyed-in digital information, means comprising an electromechanical stepping switch having a plurality of banks of contacts, means including wiring for interconnecting said registers and each of certain of said banks of contacts, means responsive to operation of said register means for marking said wiring in accordance with said keyed-in information, means whereby each of said certain banks controls the issuing of an individually associated denomniation of monetary units, means including another of said banks coupled to select each of said certain banks in sequence, and means responsive to said last named means whereby said electromechanical switch individually scans each of said certain banks of contacts under control of said other banks of contacts.

11. The system of claim 10 and means comprising an additional one of said banks of contacts for controlling the return of said switch to a home position.

12. The system of claim 10 and means for holding said register in an operated condition, and means for recycling said switch means to cause repeated issuing of monetary units in accordance with said stored information, whereby the same amount of money may be issued any desired number of times responsive to one keying-in of said digital information.

13. A money issuing system for issuing both paper money and coins comprising means including a plurality of registers for storing keyed-in digital information, means responsive to said storing of said digital information in said registers for translating said keyed-in information to indicate the denomination and number of monetary units that are to be issued, means comprising an electromechanical switch having a plurality of banks of contacts, certain of said banks being used for the control of money issuance and another of said banks being used for the control of said switch, means for wiring each of said certain banks of contacts to said translating means whereby operation of said register means responsive to said keyed-in information selectively applies markings to individual banks of said electromechanical switch in accordance with the number of monetary units that are to be issued, each of said certain banks, being marked to control the issuing of an individually corresponding denomination of monetary units, means including said other of said banks coupled to control the sequential selection of said certain banks, and means responsive to controls extended over said other bank for causing said switch to individually scan each of said certain banks of contacts.

References Cited in the file of this patent

UNITED STATES PATENTS

| | | |
|---|---|---|
| 1,870,554 | Burdick | Aug. 9, 1932 |
| 1,966,320 | Tate | July 10, 1934 |
| 2,805,675 | Noyes | Sept. 10, 1957 |
| 2,840,265 | Noyes | June 24, 1958 |
| 2,922,145 | Bobeck | Jan. 19, 1960 |
| 2,929,050 | Russell | Mar. 15, 1960 |
| 2,988,093 | Buchholz | June 13, 1961 |